July 1, 1969     M. T. ABEGG ET AL     3,453,558
OPTICAL MASER SYSTEM

Filed Sept. 7, 1965

INVENTORS
Moroni Taylor Abegg
Daniel M. Hull
William B. Leslie

BY

Attorney

INVENTORS
Moroni Taylor Abegg
Daniel M. Hull
William B. Leslie
BY
Attorney

INVENTORS
Moroni Taylor Abegg
Daniel M. Hull
William B. Leslie

United States Patent Office 3,453,558
Patented July 1, 1969

3,453,558
OPTICAL MASER SYSTEM
Moroni Taylor Abegg, Daniel M. Hull, and William B. Leslie, Albuquerque, N. Mex., assignors, by mesne assignments, to the United States of America as represented by the United States Atomic Energy Commission
Filed Sept. 7, 1965, Ser. No. 485,643
Int. Cl. H01s 3/16
U.S. Cl. 331—94.5                              5 Claims

ABSTRACT OF THE DISCLOSURE

An optical maser system including an excitable element, explosive column means partially enclosed within a channel with the exposed portion of the explosive column facing the element wherein the channel intensifies the explosive's shock wave and directs it towards the element, and a gaseous medium between the explosive column and the element to be ionized by the intensified shock wave to produce light for stimulating the element.

---

The present invention relates to masers and more particularly to an improved and more efficient optical maser (laser) system.

The excitable elements of maser systems heretofore have generally been stimulated (pumped) to coherent emission by light produced by discharging a capacitor bank through a flashlamp. The size, weight, and cost of such equipment—capacitor bank, transformers, switching equipment, cabling, flashlamps, etc.—is frequently considered objectionable. The bulk and weight of the required capacitor bank alone is prohibitive for some applications of masers or lasers. In addition, flashlamp light intensity output (pumping energy) does not possess the fast rise time desirable and the flashlamp has objectionable decay time whereby much of its energy allocable to the tailing-off of the light intensity curve is not utilized due to reasons such as arrival or availability after optical masing (lasing) has already begun or after decrease in efficiency of the excitable element due to internal heating and, in some cases, super-radiance losses.

The present invention aims to overcome or minimize the noted and other drawbacks or disadvantages by providing not only a more compact, light weight, and relatively inexpensive optical maser system, but also one which provides much greater stimulation intensification (pumping energy), of essentially square wave form, and which may be readily convoluted to conform to various desiderata. The stimulating wave form has not only a very fast rise time and readily controllable time length but also a fast or abrupt termination which eliminates previously wasted pump energy of a long "tailing-off" period.

An object of the present invention is to provide a new and improved optical maser system.

Another object of the invention is to provide an optical maser system which is of lighter weight and of more compact design than previous systems.

Another object of the invention is to provide a maser system the pumping or stimulating portion of which may be readily formed or convoluted to optimum arrangement for particular conditions at hand.

A further object of the invention is to provide an optical maser system which is more efficient than previous ones.

A still further object of the invention is to provide an optical maser system which achieves greater effective stimulating radiant energy than heretofore.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
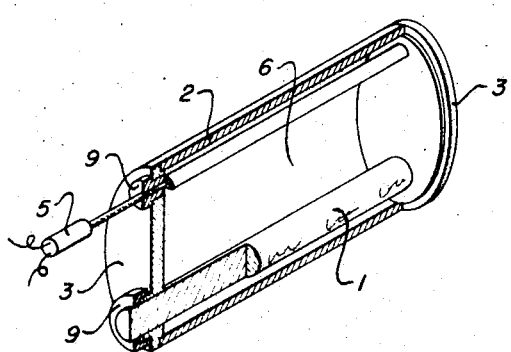
FIG. 1 is a perspective view, partly broken away, showing one form of the present invention.

In attempting to overcome the noted and other disadvantages it has been discovered that excitable elements, e.g., ruby, neodymium-doped glass, or any lasing material with a suitable pumping band, many be very effectively stimulated or pumped by an explosive in the form of a column or cord that is contiguous to and extends generally along the element. In one form of the invention (FIGS. 1 and 1a) the solid excitable element 1 is shown positioned in a tubular container 2 closed by end walls 3 with an explosive column 4, made up of either a single or multiple pieces, extending longitudinally along the element 1, one or more of suitable conventional detonator or igniting means 5 being operatively connected with the explosive column. A channel-like casing or shield 7, preferably of some relatively dense high inertia material such as lead, other metal, or the like, extends over outwardly disposed peripheral portions of the explosive column 4 for intensifying shockwaves from the column and directing stimulating radiant energy toward the excitable element 1, thereby enhancing pumping energy. The explosive column may be retained in any suitable manner, e.g., adhesively or mechanically in the member which forms the channel. The explosive should be one which has relatively high propagation or detonation velocity, preferably not less than in the neighborhood of 7000 meters per second, which of course provides a correspondingly high detonation pressure; examples of materials suitable for the column explosive are such as pentaerylthritol tetranitrate (PETN), cyclotrimethylenetrinitramine (RDX), cyclotetramethylenetetranitramine (HMX), or compositions thereof. The cross-sectional shape of the explosive column need not be semi-circular but may be semi-oval, rectangular, or otherwise, as appropriate, as may the high inertia shielding material.

To achieve spectral output that is more readily or efficiently utilizable by the excitable element the interior (space 6) of the container 2 preferably contains a shock-ionizable gas, such as xenon, at any suitable pressure ranging from less than to greater than atmospheric. Other suitable noble gases from Group VIII of the Periodic Table may also be employed, or mixtures thereof. Suitable seal means 9 prevent leakage of the gas around the rod and detonator.

Figure 1A:
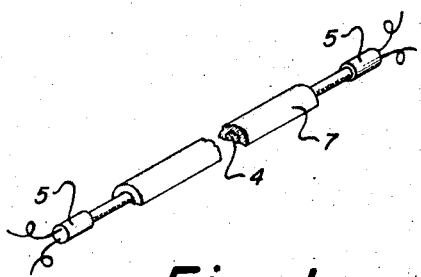
FIG. 1a is an enlarged perspective view of a portion of the device shown in FIG. 1.

While a single initiator or detonator (FIG. 1) may be used, additional may be desired and used, for example, as indicated in FIG. 1a. Two-point or multi-point initation decreases duration of energy or light output from the explosive column but approximately doubles, triples, etc., as the case may be, the intensity of stimulating energy or light output. As will be further noted hereinafter, additional initiators or detonators may be used to give enhanced energy intensities, and they may be fired individually or simultaneously in known manners. An example of a satisfactory detonator (not shown) is one in which an exploding bridge wire initiates a low-density PETN and the latter in turn starts one or more explosive columns that may be in contact therewith.

With an explosive column 4 of about 20 grains of PETN per foot, in a xenon atmosphere at ambient pressure, column detonation or propagation rate is about 7.21 millimeters per microsecond and the resulting intense energy or light pulse has a duration equal to the explosive propagation of transit time along the column. Duration of energy output may be readily controlled by selecting appropriate length of explosive column. Rise time to full intensity, as will be again referred to hereinafter, is about 3 to 10 microseconds and decay time to approximately 10% of full intensity is about 3 microseconds.

Figure 2A:
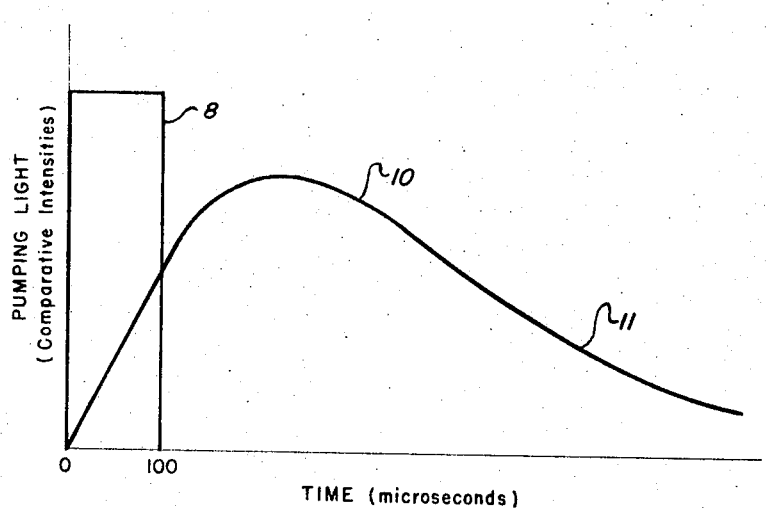
FIG. 2a is a diagram showing general types of curves of pumping or stimulating radiant energy afforded by the present device as compared with that of an electronic flashlamp.

A general comparison of light intensity output versus time afforded by the present invention as compared with that of a flashlamp is shown in FIG. 2a. The wave form 8 of the present explosive powered pump is essentially a square wave with fast rise time, which means that pumping energy can be rapidly and efficiently introduced into the excitable element; there is little or no wasted pumping energy in a long "tail." With an electronic flashlamp the waveform 10 has a much slower rise time, with much of the pumping energy being contained in the "tail" 11 or such portion of tail and "body" as to preclude efficient energy utilization due to the fact that it arrives after lasing action has begun or after element efficiency has decreased by reason of internal heating.

Figure 2B:
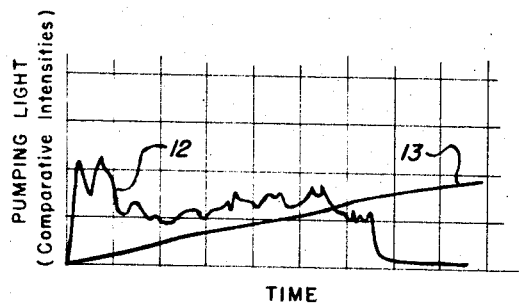
FIG. 2b is a diagram, on an enlarged scale, showing general comparative curves of stimulating radiant energy afforded by a device of the present invention as compared with that of an electronic flashlamp.

FIG. 2b shows, at enlarged scale as compared with FIG. 2a, comparative curves of light outputs and times, from oscilloscope trace photographs of a scale of 10 microseconds per centimeter, of an explosive stimulator (curve 12) and a flashlamp stimulator (curve 13). Extremely fast rise time of explosive curve 12 is clearly evident as compared with slowly rising curve 13 for the flashlamp, as is the high level of intensity throughout the propagation period of the explosive column. Even with irregularities as in the explosive stimulator curve due to smoke and the like this curve is higher.

Compactness of devices or systems of the present invention is apparent when it is realized that, with respect to the system of FIG. 1, the column 4 and its shielding channel may be only about 6 inches long and the diameter or transverse dimension of the container 2 only about 2½ inches; this is the total "package" as no capacitors, transformers, switches, etc. are required.

While excitable element examples of ruby rod or neodymium-doped glass rod have been referred to, the excitable element may comprise any appropriate type that may be excited when subjected to stimulating radiant energy or impulse. Also, the element may or may not be artificially cooled, in known manner, as desirable.

Figure 3:
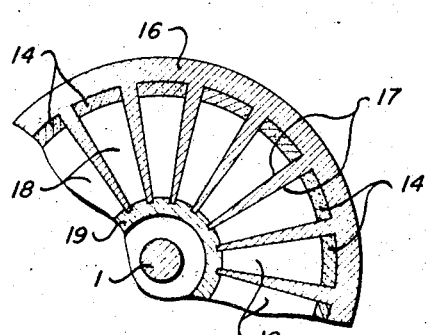
FIG. 3 is an end or transverse view of an improved form of the version shown in FIG. 1.

The form of the invention shown in the cross-sectional view of FIG. 3 is along lines of that in FIG. 1 except that explosive columns 14 (longitudinal dimensions being perpendicular to the paper) are carried in convergent channels formed by walls 17 of a housing assembly 16 and are disposed circumferentially about the excitable element 1. A transparent cylindrical shield (of material such as quartz, glass, or plastic) 19 is shown contiguous to the constricted openings or mouths of the convergent channels and ionizable gas 18 preferably occupies the space intermediate transparent protector shield 19 and the explosive column 14, and may also occupy the space between excitable element 1 and the transparent shield 19. Explosive columns 14 may be of plastic type explosive inserted into the converging channels containing the gas 18, with initiation by detonators or igniters such as for the form of FIG 1.

Wall convergence of the channels is advantageous in that this contributes to increased intensity of the explosive shock ionization wave or effect on the intermediate ionizable gas 18. The shield affords protection to the excitable element from objectionable shock as well as smoke for a few microseconds, and may protect the element for repeated usage.

Figure 4A:
FIG. 4a is a view showing how side walls of an explosive column may abut each other.
Figure 4:
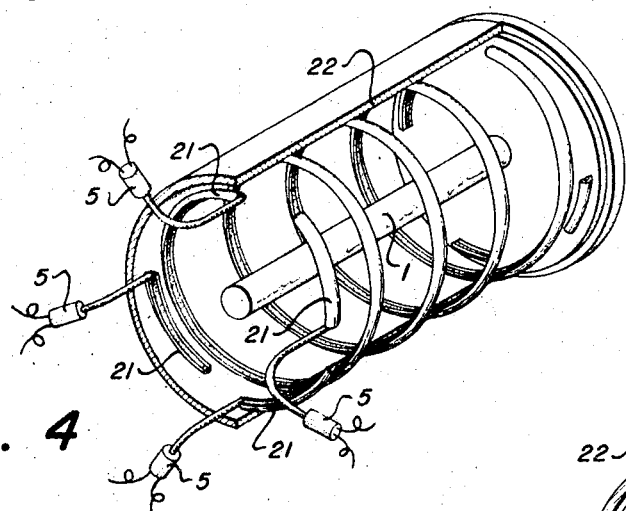
FIG. 4 is a perspective view showing another configuration of the present invention.

In order to provide a still more compact device and at the same time increase the duration and intensity of light output an explosive column or columns 21 which may be similar to those of FIGS. 1 or 3, may be convoluted or disposed in helical fashion (FIGS. 4 and 5) about and contiguous to an excitable element 1, with xenon or other gaseous medium in the space intermediate the two, the whole being housed within an outer container 22. In FIG. 4 there are shown four helically disposed columns 21, the columns being interleaved similarly to the threads of a multi-threaded screw, with initiating means 5 being operatively connected with the various columns, at various points as desired. While outer sidewalls of the columns are shown in some of the figures spaced apart for clarity of illustration, such side portions may be in contact with each other similarly to FIG. 4a. Each column 21 contributes its intensely radiant stimulating energy and to further increase intensity the columns may also be ignited at their opposite ends as well as at additional locations along their lengths.

Figure 5:
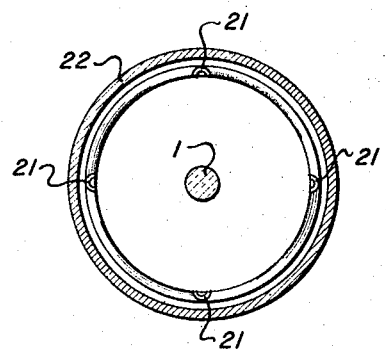
FIG. 5 is an end or transverse view of apparatus such as shown in FIG. 4.
Figure 6:
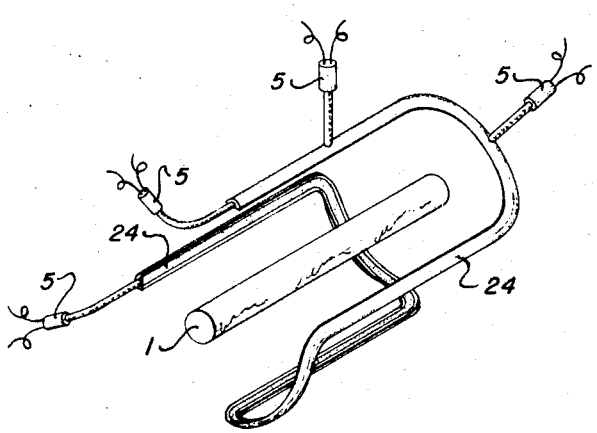
FIG. 6 is a perspective view showing a somewhat different configuration of stimulating source.

Instead of the helical arrangement of FIGS. 4 and 5, explosive columns 24 may be convoluted into to-and-fro or sinuous fashion about the excitable element as indicated in FIG. 6. The explosive column readily lends itself to convoluting or forming into a multiplicity of arrangements or configurations. Here again, a plurality of sinuous columns may be interleaved with each other and side walls of the column lengths may be in contact to form essentially a "closed" tube or cylinder rather than an "open" one.

Figure 7:
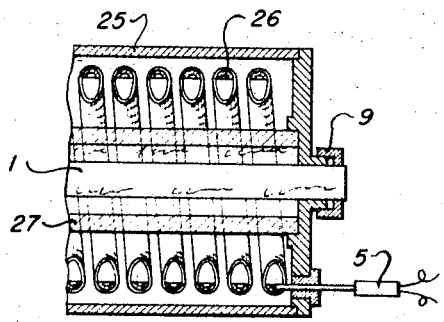
FIG. 7 is a longitudinal cross-sectional view showing a modified form of the present invention.
Figure 8:
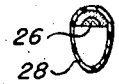
FIG. 8 is an enlarged cross-sectional view of a portion of the system shown in FIG. 7.

The form of the invention of FIGS. 7 and 8 shows the excitable element encircled by helically disposed column or columns 26 (outwardly shielded as heretofore brought out) with transparent protector shield 27 intermediate the column 26 and excitable element. In this form of the invention xenon or other suitable light-intensity-enhancing gas may be contained within a helical envelope 28 (of quartz, glass, plastic, etc.) carried by and disposed adjacent the "open" surface of the column, and may also fill the space between the column and the shield and between the shield and the explosive element. Side walls of the channel-forming member which holds the explosive column may be extended and converge similarly to FIG. 3, to thus provide similar pressure intensification for shocking the ionizable gas. As with hereinabove described columns, side walls of the channel-like shielding may abut each other to form essentially a continuous "closed" tube around the excitable element and an outer container 25 such as previously described may enclose the system.

As one example, a compact version with a single explosive column of about 20 grains per foot of PETN, propagation rate 7.21 millimeters per microsecond, in helical configuration may be with the helix disposed inside a xenon containing (at ambient pressure) tubular metal container about 2.6 centimeters in diameter, the container being about 11 centimeters long with a ruby excitable element located centrally within the helix; light pulse duration is equal to transit time of the explosive, rise time to full intensity is a 3 to 10 microseconds, and decay time to 10% of full intensity is approximately 3 microseconds. Dimensions may, however, be from about 2″ to 36″ long with an optimum about 8″, diameter from 1″ to 6″ with optimum about 3″, cross-section of explosive cord about 1/8″ and excitable element diameter from about 1/4″ to 3/4″.

Figure 9:
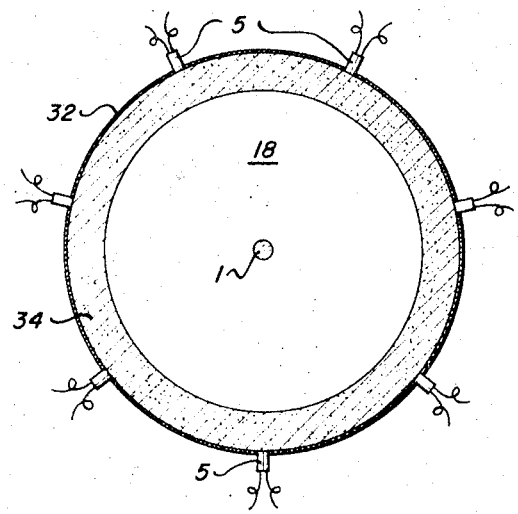
FIG. 9 is a cross-sectional diagrammatic representation of a continuous cylindrical explosive column.

FIG. 9 discloses the excitable element 1 disposed concentrically inside a cylindrical container 32. The explosive column 34 lines the interior of the container in a continuous mass and may be simultaneously ignited by a plurality of detonators 5. The simultaneous ignition of the explosive column 34 creates an approximately cylindrically shaped shock wave which in turn heats the shock-ionizable gas 18 surrounding the element 1, and the large quantity of stimulating radiant energy thus produced pumps the optical masing (lasing) of the excitable element 1.

The size of the element 1, length and inside diameter of the cylinder 32, length and thickness of the explosive column 34, number of detonators 5, and the pressure of the gaseous medium, may be varied or controlled to obtain the desired output.

It will be seen that the present invention provides a new and improved optical maser system that is much more compact, light weight, and efficient than those known heretofore. The explosive column comprising the stimulating source may be readily convoluted or arranged to any desired and appropriate configuration which is considered optimum for the conditions then at hand, e.g., linear, sinuous, helical, "open" or "closed" turns, etc. The simplicity of the device or system facilitates manufacture of its use in locations or situations where previous devices could not readily be employed because of their excessive bulk. In addition, the new system may be deemed far less expensive than previous ones and its very simplicity renders it much more reliable, to thus increase its field of usefulness.

The new device may be used for purposes similar to those for which optical maser systems have been considered, e.g., to burn holes in materials, to provide a simple powerful radar or homing device with a narrow intense beam that minimizes detection, etc.

As various changes may be made in the form, construction and arrangement of parts herein without departing from the spirit and scope of the invention and without sacrificing any of its advantages, it is to be understood that all matter herein is to be interpreted as illustrative and not in a limiting sense.

We claim:
1. A maser system comprising an elongate excitable element, explosive column means having a plurality of convolutions encircling and extending along said excitable element in close proximity thereto and including an explosive having a detonation velocity of not less than about 7000 meters per second for stimulating said element extending along said element in close proximity thereto, a high inertia material channel means containing said explosive column means and encasing outwardly disposed portions of the column means with inwardly disposed portions of the column means exposed toward said excitable element for intensifying shock waves from said explosive column means and for directing explosive energy generally inwardly toward said element, an ionizable noble gas medium for exposure to explosive energy released by said explosive column means disposed intermediate said element and explosive column means, and means for initating explosion of said column means.

2. The system as claimed in claim 1, wherein the explosive column means has the configuration of a plurality of convolutions around the excitable element and a plurality of interleaved separate lengths of such convolutions are disposed along the excitable element, and means is provided for intiating each of said separate lengths.

3. The system as claimed in claim 1, wherein said convolutions are in close proximity to each other to form a closed tubelike enclosure.

4. The system as claimed in claim 1, wherein said explosive column means and said channel means are enclosed within a transparent tube filled with an ionizable noble gas.

5. The system as claimed in claim 1, wherein said explosive column means is convoluted in a longitudinal sinuous form.

References Cited
UNITED STATES PATENTS

| | | | |
|---|---|---|---|
| 1,805,672 | 5/1931 | Ormsby | 102—24 |
| 3,160,535 | 12/1964 | Wells | 149—92 X |
| 3,235,816 | 2/1966 | Wanlass | 331—94.5 |
| 3,271,696 | 9/1966 | Dement | 331—94.5 |
| 3,289,101 | 11/1966 | Masters et al. | 331—94.5 |

RODNEY D. BENNETT, JR., *Primary Examiner.*

C. E. WANDS, *Assistant Examiner.*